United States Patent [19]

Camaret

[11] Patent Number: 4,756,493
[45] Date of Patent: Jul. 12, 1988

[54] DEPLOYMENT SYSTEM FOR SPACE RADIATORS

[75] Inventor: Timothy L. Camaret, Acton, Calif.

[73] Assignee: Rockwell International Corporation, El Segundo, Calif.

[21] Appl. No.: 904,325

[22] Filed: Sep. 8, 1986

[51] Int. Cl.[4] .................................................. B64G 1/58
[52] U.S. Cl. .............................. 244/158 R; 244/173; 29/157.3 R; 165/86
[58] Field of Search ............... 244/158 R, 158 A, 172, 244/173; 165/41, 86, 86 H; 29/157.3 R

[56] References Cited

U.S. PATENT DOCUMENTS

| | | | |
|---|---|---|---|
| 3,158,198 | 11/1964 | Hunter, Jr. | 165/86 |
| 3,347,309 | 10/1967 | Webb | 165/86 H |
| 3,496,995 | 2/1970 | Rosen et al. | 165/86 H |
| 4,373,690 | 2/1983 | Stillman et al. | 244/173 |
| 4,524,552 | 6/1985 | Hujsak | 52/108 |
| 4,599,773 | 7/1986 | Sievers | 29/157.3 R |

OTHER PUBLICATIONS

C. Goebel and T. Hammel, "Selenide Isotope Generator for the Galileo Mission", proceedings of the 13th Intersociety Energy Conversion Engineering Conf., San Diego CA., 20–25, Aug. 1978, pp. 1685–1692.

Primary Examiner—Jeffrey V. Nase
Assistant Examiner—Rodney Corl
Attorney, Agent, or Firm—H. Frederick Hamann; Harry B. Field; David C. Faulkner

[57] ABSTRACT

A deployment system for controlling unfolding kinematics of radiator panels 26 of a space power system. The deployment system includes a plurality of forming mandrels 30 associated with a housing 38 of opposing generally triangular plates 40. Within the housing, a drive wheel 52 and two additional guide wheels 50 interact with the mandrels to effect predetermined deflection and deployment of the multiple radiator panels.

10 Claims, 5 Drawing Sheets

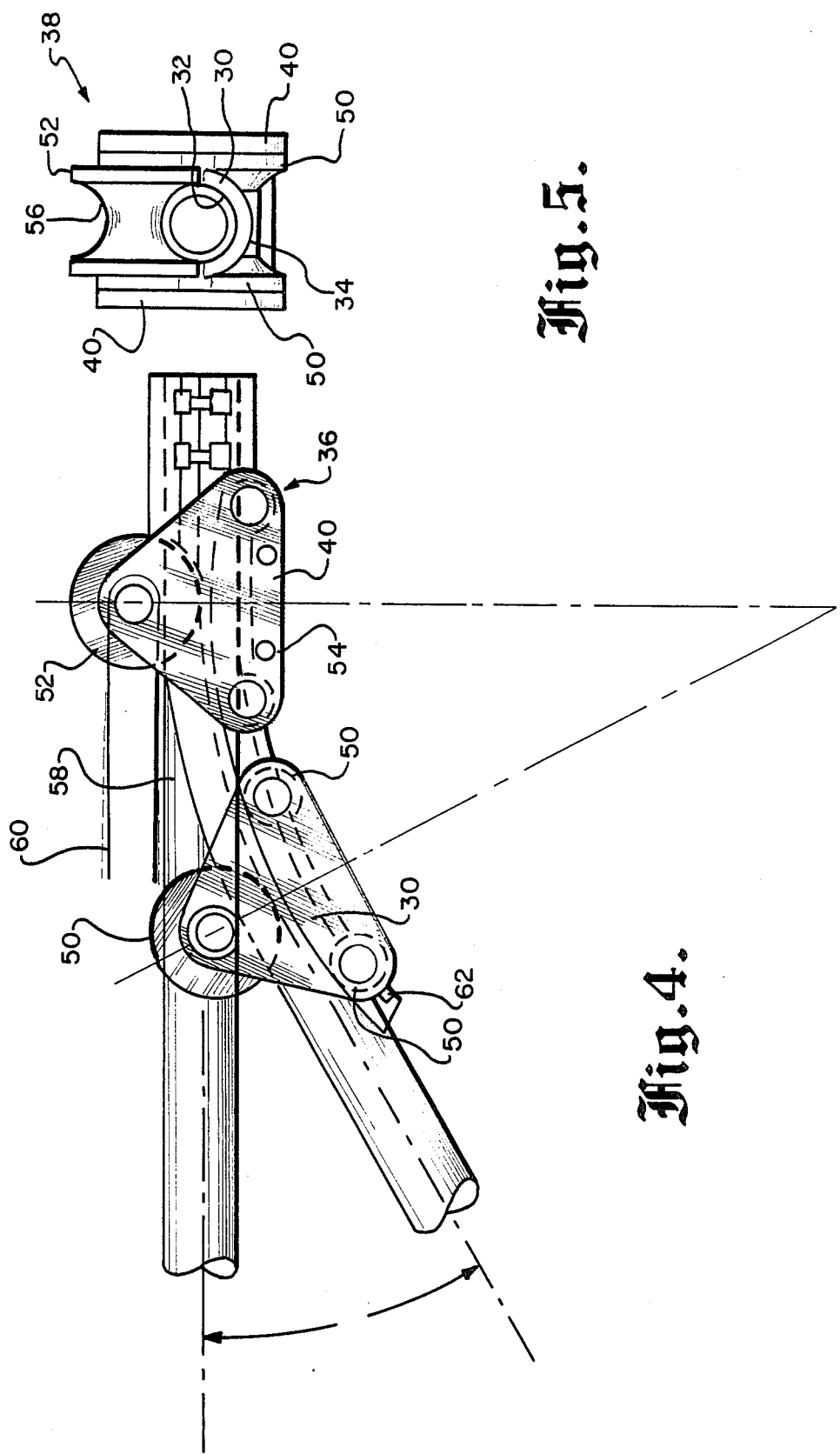

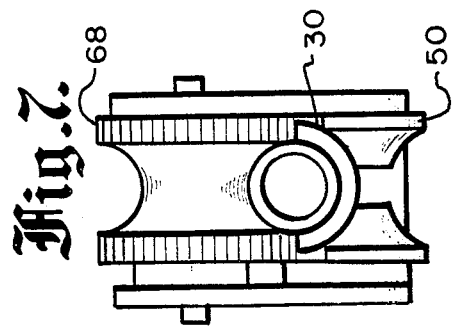
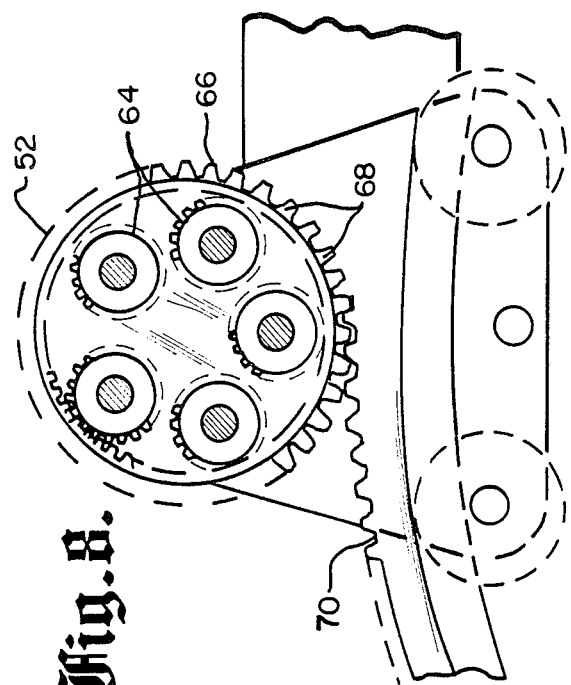
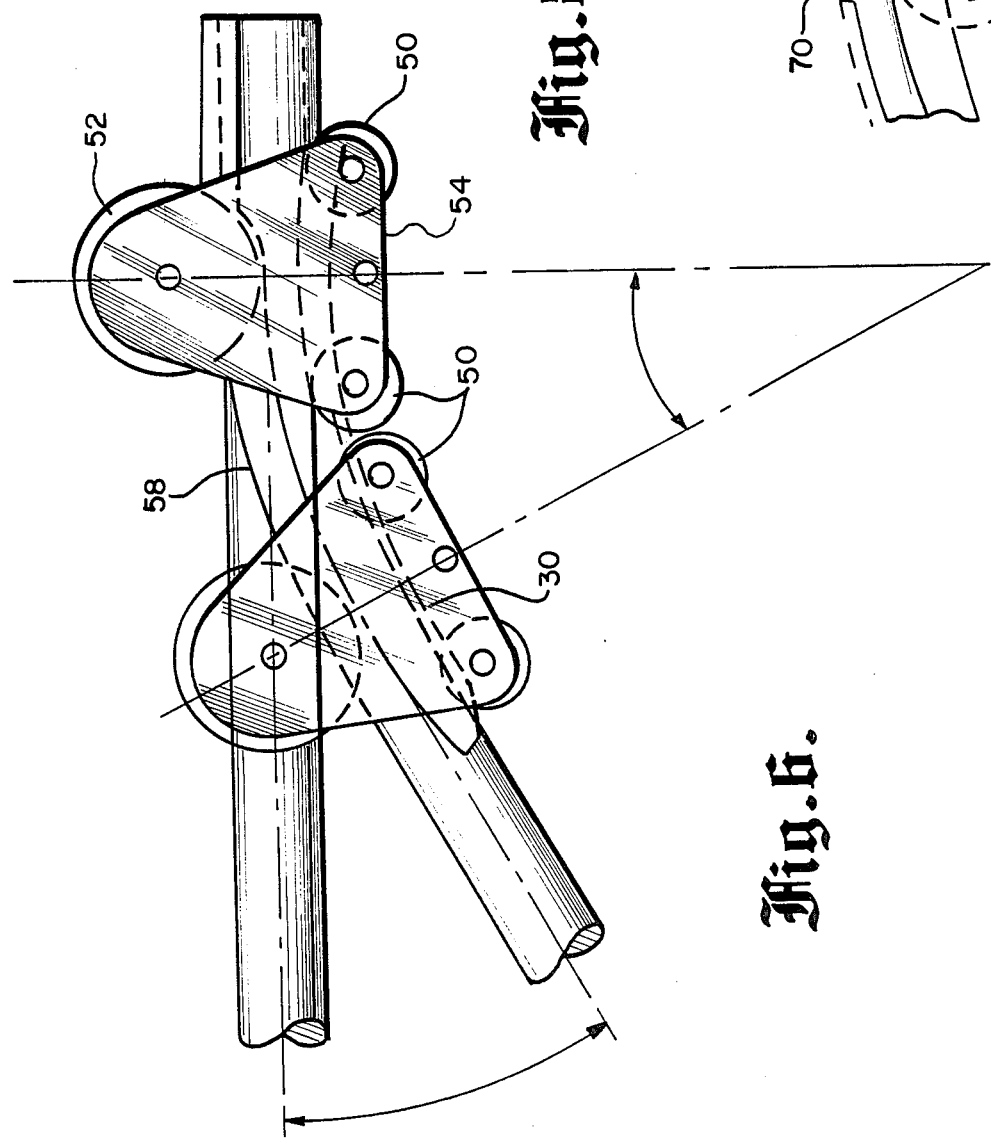

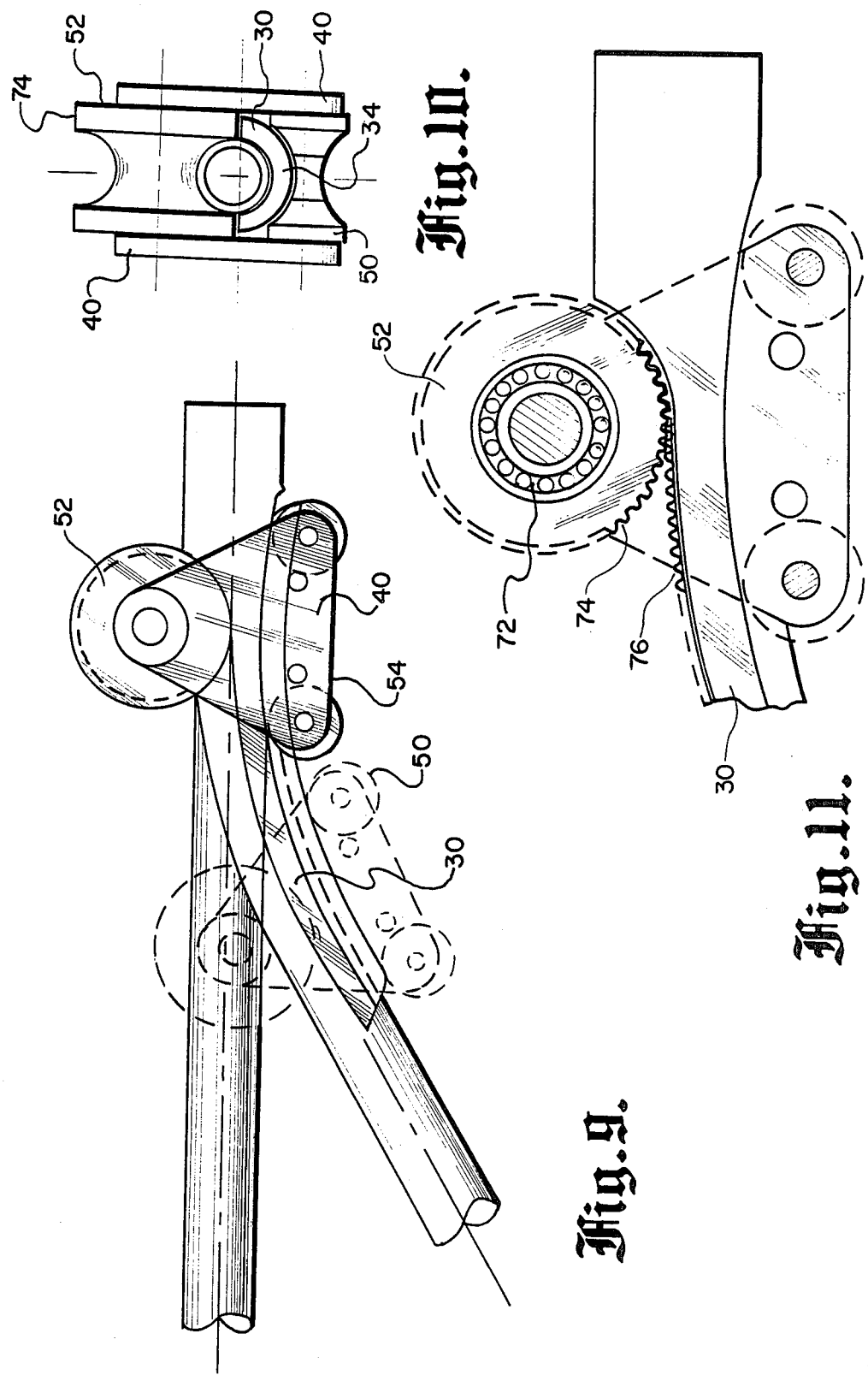

4,756,493

DEPLOYMENT SYSTEM FOR SPACE RADIATORS

BACKGROUND OF THE INVENTION

1. Technical Field

This invention relates generally to deployable or unfoldable structures unfurlable in a space environment and is directed specifically to a deployment mechanism for controlling unfolding kinematics of radiator panels of a space power system.

2. Background Art

A wide variety of mechanisms have been utilized to deploy radio or radar antennas, solar cell panel arrays, spacecraft, solar reflectors, and the like. One such deployment system utilizes a deployable support structure incorporating a passive mechanism for extending an elongated arm, having a supporting surface, from a position adjacent to a spacecraft, as disclosed in U.S. Pat. No. 4,373,690 to Stillman et al, dated Feb. 15, 1983.

A deployment system for a deployable truss structure particularly adapted to space applications is disclosed in U.S. Pat. No. 4,524,552 to Hujsak dated June 25, 1985.

This patent describes, in particular, a traveling deployment mechanism including guide rails which may be manually operated.

DISCLOSURE OF THE INVENTION

The present invention provides a deployment mechanism particularly adapted to deploying the radiator panels of a space power system after the power system is released from, for example, the cargo bay of the National Aeronautics and Space Administration's Space Shuttle Vehicle.

The deployment mechanism basically comprises a forming mandrel associated with one of two power system fluid conduit systems. A forming roller assembly in functional cooperation with the forming mandrel and an actuator effects the automatic deployment of the folded radiator panels into an operative configuration.

It is an object of the present invention to provide a deployment mechanism particularly applicable for deploying the radiator panels of a space power system in orbit and in which the embodiments disclosed are self-contained and of relative functional simplicity.

Another object of the present invention is to provide a traveling deployment mechanism for controlling unfolding kinematics of the radiator panels utilizing a forming mandrel in cooperation with forming roller means, the later provided with actuators for independent or synchronous deployment of panels.

These and other objects and features of the present invention will be apparant from the following detailed description.

BRIEF DESCRIPTION OF THE DRAWINGS

The construction designed to carry out the invention will be hereinafter described, together with other features thereof.

the invention will be more readily understood from a reading of the following detailed description when considered in connection with the accompanying drawings wherein:

FIG. 4 is a side elevation view of one embodiment of the traveling deployment mechanism shown in pre- and post-activated positions.

FIG. 5 is a front elevation view of the deployment mechanism.

FIG. 6 is a side elevation view of a second embodiment of the traveling deployment mechanism.

FIG. 7 is a front elevation view of the embodiment shown in FIG. 6.

FIG. 8 is a more detailed view of component parts of the second embodiment of the traveling deployment mechanism.

FIG. 9 is a side elevation view of a third embodiment of the traveling deployment mechanism.

FIG. 10 is a front elevation view of the embodiment shown in FIG. 9.

FIG. 11 is a more detailed view of component parts of the third embodiment of the traveling deployment mechanism.

DETAILED DESCRIPTION

Figure 1:
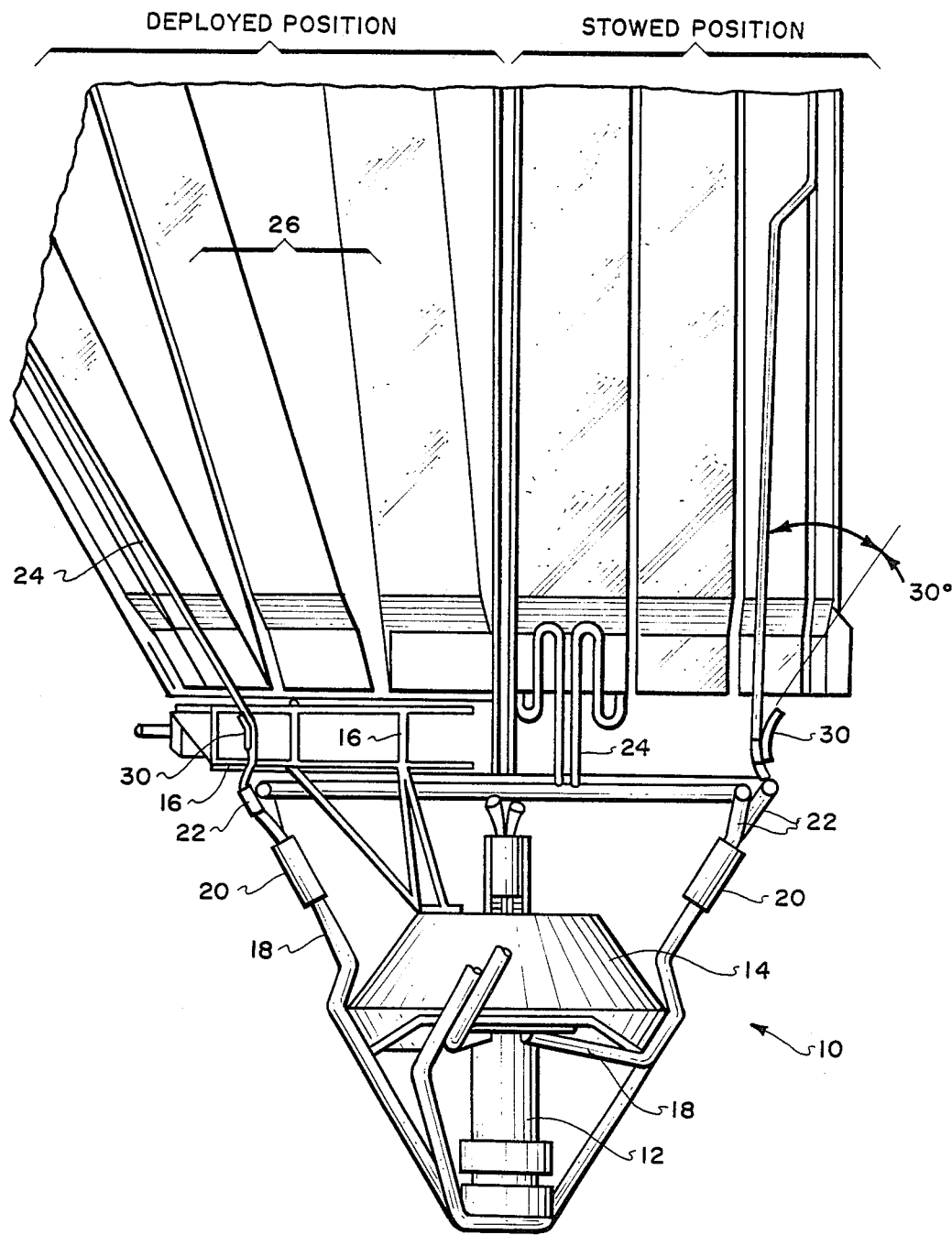
FIG. 1 is a perspective view of a space power system including the forming mandrel of the deployment mechanism.

Referring now to the drawings and more particularly to FIG. 1, there is depicted a space power system 10. The space power system incorporates a heat generating source 12 such as a nuclear reactor and a radiation shield 14. Coupled to the heat generating source 12 is a truss support structure 16. Integral to the heating generating source and associated with the truss support structure is a first heat fluid conduit system 18.

The first heat fluid conduit system incorporates a series of heat fluid pumps 20 such as thermoelectric magnetic pumps, which serve to pump a heated transport fluid (e.g. Li, Na, K, NaK) which is liquified by the heat generating souce to manifold 22 positioned beneath truss support structure 16. Manifold 22 is in direct communication with heat pumps 20 and a second fluid conduit system 24 and a plurality of lightweight deployable radiator panels 26.

Figure 2:
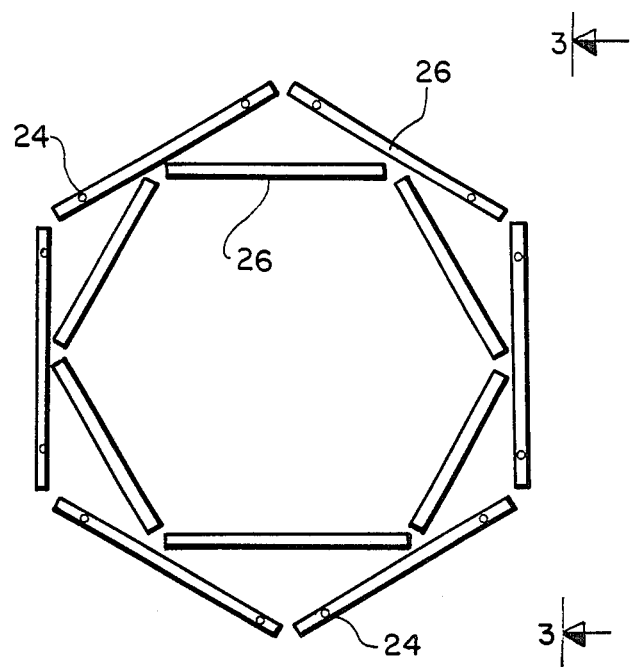
FIGS. 2 and 3 illustrate the folded configuration of the radiator panels stored within the Space Shuttle Vehicle prior to deployment, front and side views respectively.
Figure 3:
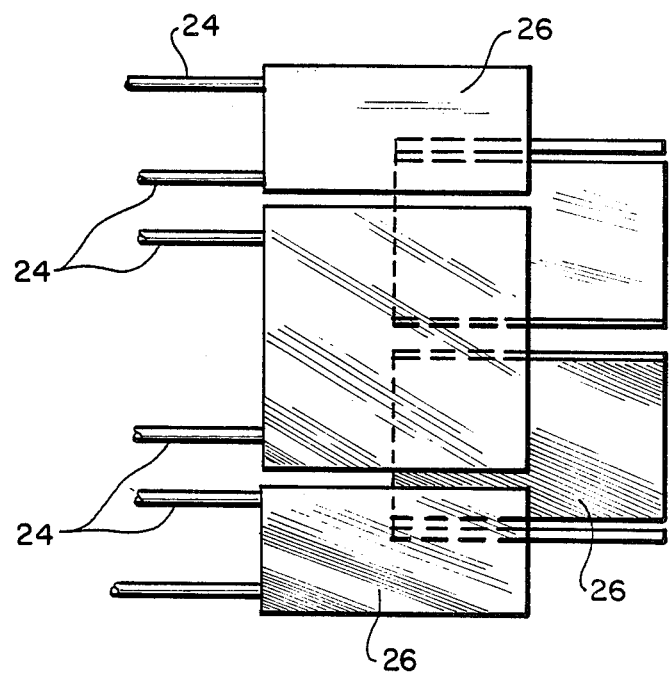

The space power system shown in FIG. 1 may be carried into an earth orbit within the cargo bay of the National Aeronautics and Space Administration's Space Shuttle Vehicle. During transit, the radiator panels 26 are stowed in accordian-like fashion as schematically shown in FIGS. 2 and 3.

Upon attaining a proper earth orbit, the space power system is released from the Shuttle Vehicle cargo bay. The radiator panels are deployed to an operational configuration by bending a portion of piping of the second fluid conduit system about 30° from the midline of the space power system as shown in FIG. 1.

To effect deployment of the radiator panels, a deployment mechanism 28 is provided. As shown in FIGS. 4 and 5, a first embodiment of the deployment mechanism includes one of several forming mandrels 30 angled about 30° and attached to a predetermined segment of the second heat fluid conduit system (see FIG. 1). Each mandrel has a concave cross section 32 and a convex outer surface 34. Forming roller means 36 include a housing 38 formed of opposing, generally triangular plates 40 which enclose and retain three guide wheels 50, one being a drive wheel 52 disposed near the apex of the housing 38 and the remaining two guide wheels disposed in axial alignment at opposite ends of the housing base 54 below the mandrel 30 and in contact with the convex surface 34 thereof. In this configuration, the housing 38 and guide wheels 50 enclose a portion 58 of the second fluid conduit system.

In the deployment mechanism of FIG. 4, actuating tapes or bands 60, for example, flat band steel tapes, encircle drive wheel 52 of each deployment mechanism proximate the center of the concave portion 56 thereof. These bands terminate and connect at inner points (not shown) within the interface framework of the truss support structure with an actuator or motor and microprocessor control system located at or near the radiation shield. The motor in this embodiment and the microprocessor control system in general do not form any part of the present invention, and neither are shown in the drawings.

In operation, the deployment mechanism of the first embodiment would be activated by the control system to deploy the radiator panels synchronously or in sequence. Upon activation, the motor or actuator would cause the bands or tape associated with each deployment mechanism drive wheel to tighten and in so doing cause the roller means to be drawn along the forming mandrel 30. The deployment mechanism advances along the mandrel a predetermined distance or until curtailed by stops 62 located near the end of the mandrel. As the mechanism advances the conduit of the second heat fluid conduit system connected to each radiator panel is deflected about 30° thereby effecting the desired radiator panel deployment.

Referring now to FIGS. 6, 7 and 8 there is shown a second embodiment of a deployment mechanism according to the present invention.

In this second embodiment, the drive wheel 52 is provided internally with a planetary gear system 64. The rim surface 66 of the drive wheel includes gear teeth 68 which mesh or engage a toothed rim surface 70 of mandrel 30.

A series of cables (not shown) replace the bands or tapes of the first embodiment but like the tapes interconnect to and form a network emanating from each deployment mechanism and terminating at the above mentioned motor and microprocessor control system assembly. When activated, the forming roller means would track along toothed surface 70 and by bending the portion 58 of the second conduit system cause the desired deflection (30°) and resulting deployment of the radiator panels.

FIGS. 9, 10 and 11 show a third embodiment of the radiator deployment mechanism. In this particular embodiment, drive wheel 52 is configured to incoporate therein a d.c. motor 72 which in operation drives the drive wheel causing the toothed rim surface 74 of the wheel to mesh with the toothed gear surface 76 of mandrel 30 and advance the deployment mechanism as described with respect to the second embodiment. Power cables (not shown) are provided to connect each of the drive wheels of each deployment mechanism of this embodiment to the aforementioned microprocessor control system assembly.

Other applications, variations and ramifications of this invention will occur to those skilled in the art upon reading this disclosure. These are intended to be included within the scope of this invenion as defined by the appended claims.

What is claimed and desired to be secured by Letters Patent of the United States is:

1. A traveling deployment mechanism for controlling unfolding kinematics of radiator panels of a space power system, the space power system comprising:

(1) a heat generating source including a radiation shield;
(2) a truss support structure attached to the radiator shield;
(3) a first heat fluid conduit system functionally associated with the heat source;
(4) heat fluid pumps functionally interconnecting the first conduit system and a manifold;
(5) a second fluid conduit system functionally associated with the manifold;
(6) a plurality of lightweight deployable radiator panels functionally associated with the second fluid conduit system;
the deployment mechanism for controlling unfolding kinematics of the radiator panels comprising:
(1) a plurality of forming mandrels including forming mandrel surfaces associated with the second fluid conduit system; and
(2) a plurality of forming roller means cooperating with the forming mandrels for controllably deploying the radiator panels.

2. The deployment mechanism of claim 1 in which the forming mandrels each comprise a tube bending runner bar having a concave inner cross section, an opposite convex surface, and an outer rim surface, this runner bar being mated to and angled away from a segment of the second fluid conduit functionally associated with the radiator panels.

3. The deployment mechanism of claim 2 in which each forming roller means comprises a housing of opposing generally triangular plates having three guide wheels incorporated therebetween, one of which is a drive wheel disposed near the apex of the triangular plates positioned above the runner bar and a portion of a second conduit system, the remaining two wheels each disposed at opposite ends of the housing base but below the runner bar all wheels having an inner concave cross section surface and an outer rim with a surface, which in operation deflect a portion of the second fluid conduit system.

4. The deployment mechanism of claim 3 in which each wheel further includes a transverse axle, the axle of the drive wheel located near the apex of the triangular halves and associated with means for effectuating movement of the forming roller means.

5. The deployment mechanism of claim 4 in which the means for effectuating movement of each forming roller means comprise actuating tapes attached near the mid-point of each drive wheel.

6. The deployment mechanism of claim 4 in which the means for effectuating movement of each forming roller means comprise a planetary gear system housed within each drive wheel, each drive wheel having gear teeth on the rim surface thereof, and the rim surface of each forming mandrel further provided with a toothed surface in engaging association with gear teeth on the surface of each drive wheel and means for activating the planetary gear system to effect movement of the forming roller means along each forming mandrel.

7. The deployment mechanism of claim 4 in which the means for effectuating movement of each forming roller means comprise a d.c. gear motor housed within each larger wheel, each larger wheel having gear teeth on the rim surface thereof, the rim surface of each forming mandrel further provided with a toothed surface, and means for activating the d.c. gear motor to effect movement of each forming roller means along the forming mandrel.

8. The deployment mechanism of claim 5 in which the actuating tapes are of flat band steel.

9. The deployment mechanism of claim 6 in which the means for activating the planetary gear system comprise drive cables.

10. The deployment mechanism of claim 7 in which the means for activating the d.c. gear motor comprises electrical conduits to supply power to the gear motors.

* * * * *